United States Patent [19]

Berlioux

[11] 4,223,776
[45] Sep. 23, 1980

[54] FRICTION CLUTCH PLATE ASSEMBLY WITH TORSION DAMPING HUB

[75] Inventor: Jacques Berlioux, Sucy-en-Brie, France

[73] Assignee: Societe Anonyme Francaise du Ferodo, Paris, France

[21] Appl. No.: 880,704

[22] Filed: Feb. 23, 1978

[30] Foreign Application Priority Data

Feb. 25, 1977 [FR] France .................. 77 05529
Dec. 13, 1977 [FR] France .................. 77 37511

[51] Int. Cl.² ........................................ F16D 3/14
[52] U.S. Cl. .................... 192/106.2; 192/70.17; 192/106.1
[58] Field of Search .............. 192/106.2, 106.1, 70.17, 192/70.16, 55; 64/27 C, 27 CT, 27 F, 27 L

[56] References Cited

U.S. PATENT DOCUMENTS

| | | | |
|---|---|---|---|
| 1,830,746 | 11/1931 | Ahlene et al. ......................... | 192/55 |
| 1,942,677 | 1/1934 | Wood ....................................... | 192/55 |
| 1,946,144 | 2/1934 | Hughes ............................. | 192/106.1 |
| 1,954,190 | 4/1934 | Zeder ................................. | 192/106.2 |
| 2,114,247 | 4/1938 | Davis ................................. | 192/106.1 |
| 2,210,074 | 8/1940 | Friedman ......................... | 192/106.2 |
| 4,068,749 | 1/1978 | Antrim ............................... | 192/106.1 |

*Primary Examiner*—Kenneth Downey
*Attorney, Agent, or Firm*—Charles E. Brown

[57] ABSTRACT

In a clutch friction plate of the kind comprising a hub and a pair of washers coaxial with the hub and adapted to move angularly with respect thereto against the action of spring means operable to damp the friction plate during rotation, the washers are joined together by spacer means which comprise axially-directed extensions of at least one of the washers, which extensions form a circularly continuous flange on at least one washer, and a friction disc is fastened to one of the washers in a connection region which is bounded by a circumference having a diameter which is not greater than that of the circumference around which the axial extensions are located.

29 Claims, 31 Drawing Figures

FRICTION CLUTCH PLATE ASSEMBLY WITH TORSION DAMPING HUB

BACKGROUND OF THE INVENTION

The present invention relates generally to clutch friction elements, and particularly to friction plates for automobile vehicles, of the kind comprising two coaxial elements arranged to rotate relative to one another against the action of elastic means interposed between them, namely a first element having a hub and a second element comprising two washers which are joined to one another by spacer means, the said spacer means comprising axial extensions belonging to at least one of the said washers and connected to the other of the latter, while one of the said washers carries a friction disc.

The present invention relates more particularly to the case where the said axial extensions form—for at least one of the washers—a circularly continuous axial flange.

This provides the advantage of stiffening the guide washer concerned and therefore enabling the latter to withstand more effectively the action of centrifugal force.

An arrangement of this kind is already known per se, particularly from French Pat. No. 1,495,611.

Nevertheless, as in the case of the French patent mentioned, it is generally accompanied by radial displacement of the fastening of the friction disc to a point beyond the circumference on which the aforesaid circularly continuous axial flange of the washer concerned extends, the said washer having, at the end of the aforesaid flange, an annular flange extending in a generally transverse plane and projecting radially in the opposite direction to the axis of the whole arrangement, while the friction disc is clamped and fixed between the said annular flange of the washer in question and the other washer.

Other conditions being equal, this has the consequence that for a given transmissible torque the radial dimensions of the friction element are increased, or that for given dimensions the transmissible torque possible for this friction element is reduced.

The main object of the present invention is the provision of a clutch friction element of the kind in question, in which the disadvantages briefly set forth above are overcome.

SUMMARY

In the clutch friction element of the invention, the friction disc is fastened to the washer carrying it over a region of the washer which is bounded by a circumference of a diameter at most equal to that of the circumference on which extend the axial extensions forming a circularly continuous axial flange for at least one of the washers.

Thus, in one and the same clutch friction element are combined the advantages resulting from the stiffening of at least one of the washers, which benefits the entire friction element, and those resulting from the fastening of the friction disc on a circumference of relatively small diameter, which in any case is smaller than that of the periphery of largest diameter of the said washer.

The present invention also seeks to define various alternative embodiments benefiting from this combination and in addition possessing other advantages, particularly those resulting from the fact that, in cases where the hub carries radially a hub disc between the washers, the spacer means which connect the said washers to one another and which, as recalled above, are formed by axial extensions belonging to one or the other of the said washers, are transferred to a region beyond the periphery of the hub disc; since these spacer means no longer pass axially through the hub disc, as on the contrary is usually the case, more space is available in the hub disc for the provision of the windows which are necessary to accommodate the elastic means, so that, other conditions being equal, this may permit the use of more powerful elastic means, while the relative angular movement which is possible between the hub disc and the washers is no longer limited by the said spacer means; thus, other conditions being equal, this may make it possible to give a greater amplitude to this movement. Futhermore, since the hub disc no longer has to be perforated for the passage of the spacer means, its mechanical strength is improved.

In a particular embodiment of the invention the stiffening of a washer by a circularly continuous axial flange is further reinforced by the fact that the axial extensions which form the spacer means between the washers and with which a flange of this kind is associated constitute together a crown which extends axially continuously or substantially continuously from the periphery of one of the said washers to the periphery of the other washer, beyond the periphery of the hub disc.

The washers and the spacer means connecting them thus form a kind of particularly rigid and strong annular box to which the friction disc is fixed.

According to another embodiment of the invention, complementary indentation means are provided between the two washers, these indentation means being constituted for example by the axial extensions of the washers forming spacer means between them, these axial extensions belonging alternately to each of the said washers and, at their free axial end, being fastened to the opposite washer to that from which they originate.

DESCRIPTION OF THE PREFERRED EMBODIMENTS

Figure 1:
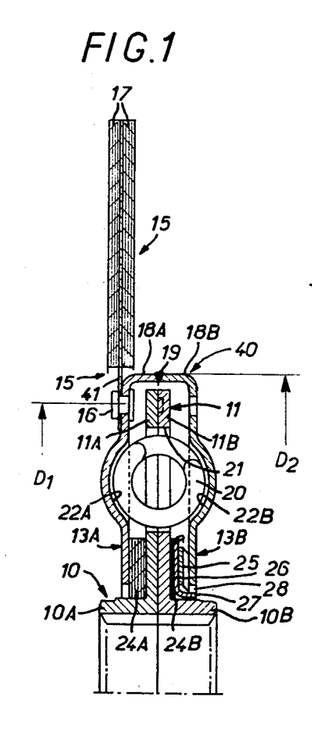
FIG. 1 is a half-view in axial section of a clutch friction element according to the invention.

FIG. 1 shows a damping-hub clutch friction element comprising two coaxial members mounted for rotation relative to one another against the action of elastic means interposed circumferentially between them.

A first of these members is formed by a hub 10 and a hub disc 11 carried radially by the said hub.

In the embodiment illustrated, the hub 10 is formed of two separate parts 10A and 10B suitably laid one against the other axially, and similarly the hub disc 11 is formed of two elementary hub discs 11A, 11B suitably laid axially one against the other.

This arrangement, however, is not imperative, but on the contrary the hub 10 and hub disc 11 may each be formed in the conventional manner of a single piece, or even be conjointly formed of a single piece.

The second of the coaxial members of which the friction element or clutch disc assembly is composed comprises two washers 13A, 13B which frame the hub disc 11 and which are axially fastened to one another by spacer means.

These spacer means comprise axial extensions which belong to at least one of the washers 13A, 13B and are connected to the other washer, and which in the case of at least one of the washers form a circularly continuous axial flange on the outer periphery of the washer or washers.

In the example shown in FIG. 1, these axial extensions form a circularly continuous axial flange 18A, 18B for each of the washers 13A, 13B, and the washers 13A, 13B are disposed with the free edge of their flanges 18A, 18B one against the other, the flanges being fastened to one another by a continuous or discontinuous weld bead 19.

In the embodiment illustrated the circularly continuous axial flanges 18A, 18B of the washers 13A, 13B are integral with the latter and axially have the same height, so that the washers 13A, 13B are identical to one another.

However this may be, the axial extensions formed by these circularly continuous axial flanges 18A, 18B form together in this case a crown 40 which extends axially continuously from the periphery of the washer 13A to the periphery of the washer 13B, beyond the periphery of the hub disc 11.

The washers 13A, 13B and the crown 40 axially connecting them to one another thus together form a kind of particularly rigid annular box in the middle portion of which the hub disc 11 is engaged.

One of these washers, namely the washer 13A in the example of embodiment illustrated, carries radially a friction or clutch disc 15 formed in the usual manner of an annular lining carrier plate 41 provided axially, on its periphery, and on each of its faces, with friction linings 17.

The lining carrier plate 41 is fixed to the washer 13A, for example by rivets 16 as illustrated, and it should be observed that in conjunction with the presence of axial extensions forming circularly continuous axial flanges 18A, 18B on the periphery of the washers 13A, 13B, the region of the washer 13A in which the lining carrier plate 41 of the friction disc 15 is fastened to the said washer is bounded by a circumference of a diameter at most equal to that of the circumference on which the said circularly continuous axial flanges or extensions extend.

In practice this fastening is effected on a circumference of a diameter D1 which is smaller than the diameter D2 of the circumference on which the circularly continuous axial flanges 18A, 18B of the washers 13A, 13B extend.

Moreover, in a manner known per se the elastic means interposed between the two coaxial members of this composition in the clutch friction element concerned comprise, in the example illustrated, a plurality of springs 20 each of which extends substantially tangentially and is disposed partly in windows 21 cut out in the hub disc 11 and partly in recesses 22A, 22B formed, for example by stamping, in the washers 13A, 13B.

Likewise in a manner known per se, friction means are also provided which comprise, on the one hand between the washer 13A and the hub disc 11, a friction washer 24A and, on the other hand between the washer 13B and the hub disc 11, a friction washer 24B which, like the friction washer 24A, is subjected to the action of an axially acting elastic washer 25, for example of the "ONDUFLEX" type, which bears against the washer 13B.

In the embodiment illustrated the friction washer 24B is carried by an application washer 26 rotationally fixed on the washer 13B by axial lugs 27 engaged for that purpose in openings 28 in the washer 13B.

As is known, the friction disc 15 is intended to be gripped axially between two plates which are rotationally fixed to a shaft, which in practice is a driving shaft.

When a torque is thus applied to the friction disc 15, the latter transmits it to the washers 13A and 13B and the latter transmit it in turn by way of the springs 20 to the disc hub 11 and therefore to the hub 10.

In the foregoing the crown 40 forming the spacer means between the washers 13A and 13B is partly composed of a circularly continuous axial flange of one of these washers and partly by a circularly continuous axial flange of the other washer.

Figure 2:
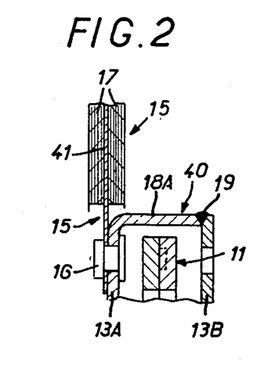
FIGS. 2 and 3 show a part corresponding to FIG. 1, each relating to a respective embodiment.

In the embodiment illustrated in FIG. 2, this crown 40 is entirely formed by a circularly continuous axial flange of one of the said washers, namely, in the example illustrated, the circularly continuous axial flange 18A of the washer 13A carrying the friction disc 15.

As previously, this circularly continuous axial flange 18A is in the example illustrated in one piece with the washer 13A with which it is associated.

The weld bead 19 is here situated between the free edge of this circularly continuous axial flange 18A and the outer periphery of the washer 13B, the latter in this case not being provided with a circularly continuous axial flange.

Figure 3:
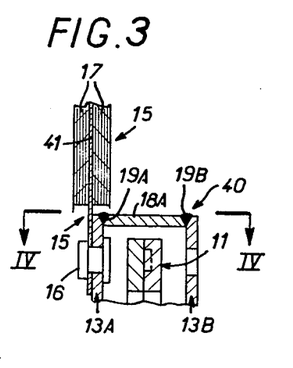
Figure 4:
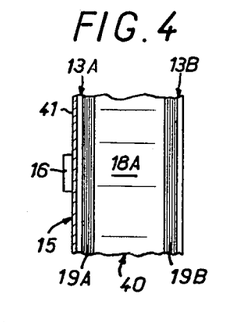
FIG. 4 is a partial view in section of the modified embodiment shown in FIG. 3, taken on the line IV—IV in FIG. 3.
Figure 5:
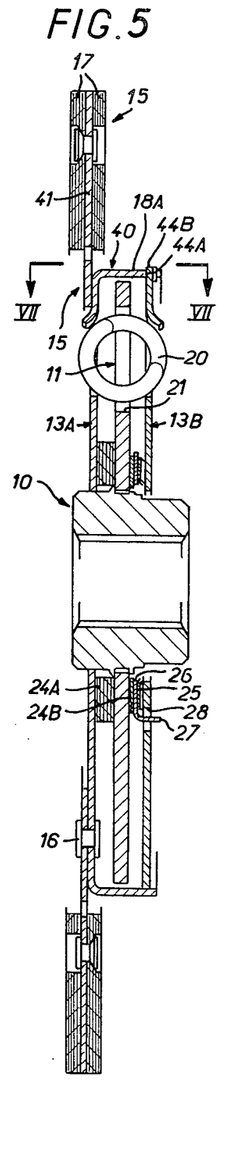
FIG. 5 is a view in axial section of another clutch friction element according to the invention, taken on the line V—V in FIG. 6.
Figure 6:
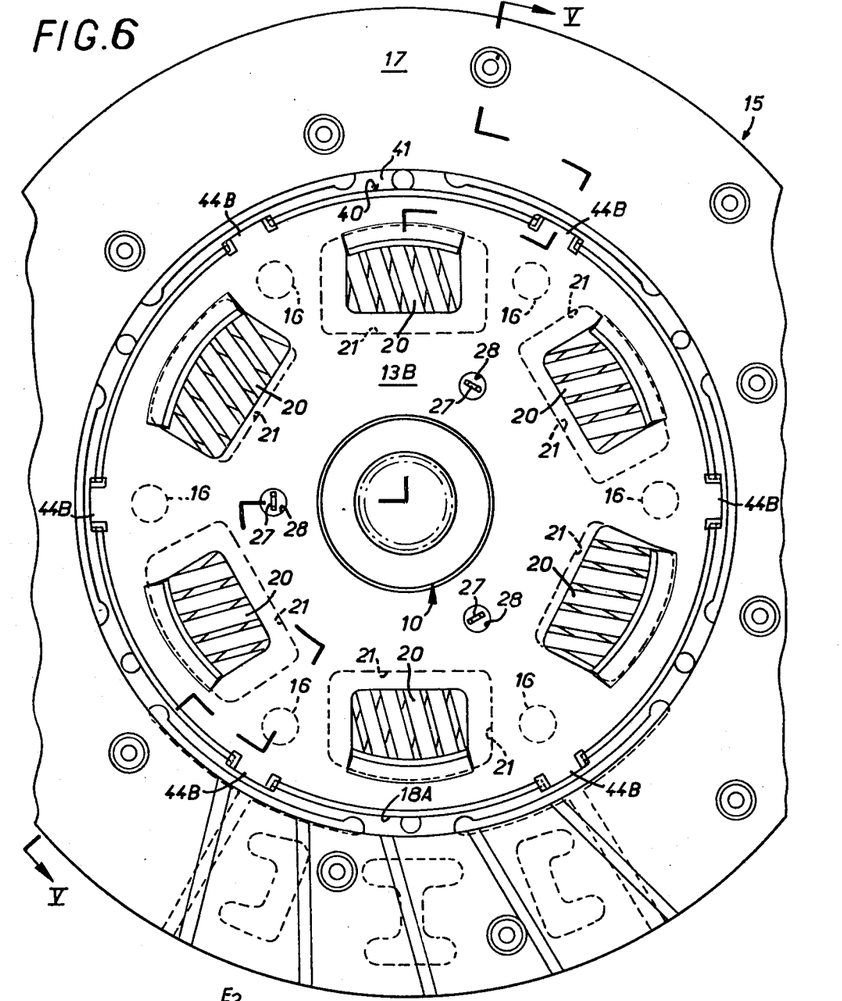
FIG. 6 is a partial view in elevation of this clutch friction element.
Figure 7:
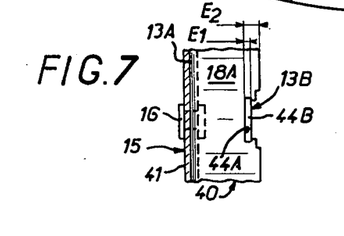
FIG. 7 is a partial view in section, taken on the line VII—VII in FIG. 6.

In the modified embodiment illustrated in FIGS. 3 and 4, the circularly continuous axial flange of a washer is composed of a part attached to the latter, so that the crown 40 which it forms is fastened at one of its axial ends to the said washer and its other axial end to the other washer.

For example, in parallel with the embodiment shown in FIG. 2, it may be considered that the crown 40 forms the circularly continuous axial flange 18A of the washer 13A.

However this may be, in this case this crown 40 forms by itself a unitary part extending continuously both axially from one of the washers 13A, 13B to which it is fastened by weld beads 19A, 19B to the other washer, and circularly.

In the embodiment illustrated in FIGS. 5 to 8, the crown 40 is formed by the circularly continuous axial flange 18A of the washer 13A, and from place to place this flange is provided on its free edge with mortises 44A for the purpose of fastening it to the washer 13B, while correspondingly the washer 13B has tenons 44B which project radially from its periphery and are directed perpendicularly to the axis, each tenon being individually engaged in one of the mortises 44A.

Each tenon 44B has axially a thickness E1 smaller than the depth E2 of the corresponding mortise 44A.

In practice this thickness E1 is that of the washer 13B and the depth E2 of the mortises 44A is adapted accordingly.

However this may be, the circumferential edges of a mortise 44A thus extend axially beyond the tenon 44B which is engaged in it, and at least one of these circumferential edges—or in practice both of them as illustrated—is or are at least locally crimped by flowing, thus engaging over the tenon 44B which is thereby held firmly in contact with the bottom of the mortise 44A, thereby joining together the washers 13A and 13B.

Figure 8:
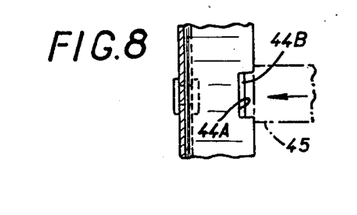
FIG. 8 is a similar view to FIG. 7, illustrating the method of fastening of the corresponding washers during the assembly of the whole arrangement.

In FIG. 8 the press tool suitable for effecting the crimping of flowing of the circumferential edges of a mortise 44A after engagement of a tenon 44B in the said mortise is shown at 45 in broken lines.

Figure 9:
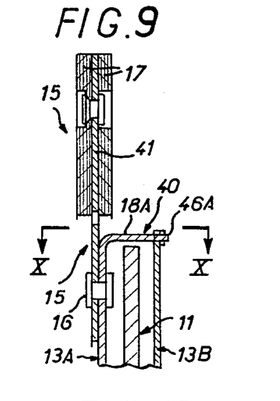
FIG. 9 is a partial view in axial section of another clutch friction element according to the invention.
Figure 10:
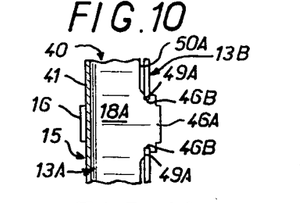
FIG. 10 is another view in section of this modified embodiment, taken on the line X—X in FIG. 9.
Figure 11:
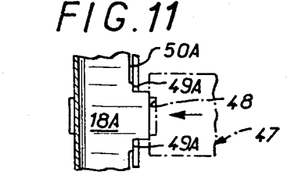
FIG. 11 is a similar view to that in FIG. 10 and illustrates the method of fastening the washers in question during the assembly of the whole arrangement.
Figure 12:
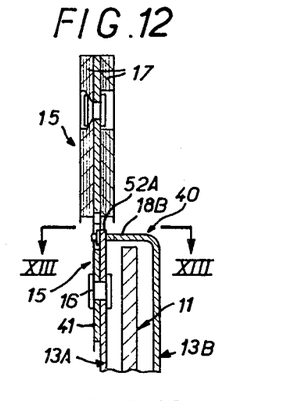
FIGS. 12 and 13 are views similar respectively to FIGS. 9 and 10 and relate to a modified embodiment.
Figure 13:
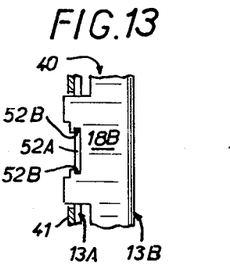
Figure 14:
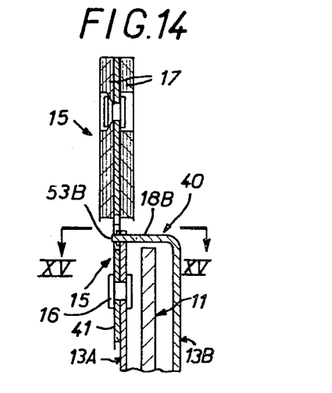
FIGS. 14 and 15 are likewise similar views respectively to those in FIGS. 9 and 10, and relate to another modified embodiment.
Figure 15:
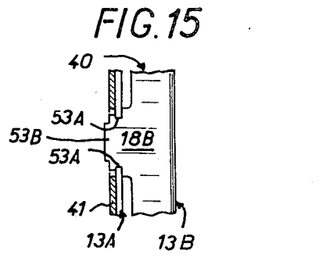

In the modified embodiment shown in FIGS. 9 to 11 the opposite arrangement is adopted; it is the circularly continuous axial flange 18A forming the crown 40 of the washer 13A that is provided from place to place with tenons 46A projecting on its free edge for the purpose of fastening it to the washer 13B, these tenons 46A being directed parallel to the axis and the washer 13B being correspondingly provided on its periphery with passages, or in practice with mortises 46B in the example illustrated; each of these tenons 46A is individually engaged in a mortise 46B and, beyond the latter, it is at least locally crimped by flowing in order to engage over the washer 13B and secure the latter.

In the example of embodiment illustrated only the circumferential edges of a tenon 46A are thus crimped by flowing, the tool 47 used having a cavity 48 in its middle portion (FIG. 11).

Furthermore, in order to take into account inevitable tolerances in cutting-out, in the example illustrated each tenon 46A of the circularly continuous axial flange 18A is laterally flanked on each side by a support shoulder 49A projecting radially in relation to the remainder 50A of the edge of this flange, this edge thus being "backed off".

Despite this backing-off, which is employed for simple practical reasons of construction, the crown 40 connecting the washers 13A, 13B to one another still extends essentially continuously from one washer to the other.

In the foregoing this crown 40 is formed by a circularly continuous axial flange 18A belonging to the washer 13A.

As an alternative (FIGS. 12 to 21) it is formed by a circularly continuous axial flange 18B belonging to the washer 13B.

As previously, a flange of this kind can be fastened to the washer 13A either (FIGS. 12 and 13) with the aid of tenons 52A belonging to the washer 13A and engaged in mortises 52B in the circularly continuous axial flange 18B, or (FIGS. 14 and 15) with the aid of tenons 53B belonging to the circularly continuous axial flange 18B and engaged in mortises 53A in the washer 13A.

Whichever arrangement is adopted, the normal portion of the edge of the circularly continuous axial flange 18B is, as previously, preferably backed off.

In the foregoing the lining carrier plate 41 of the friction disc 15 is disposed outside the volume formed by the washers 13A, 13B, this plate 41 being applied against the outer face of the washer 13A and, in the embodiment shown in FIGS. 12 to 15, being provided from place to place with passages or cutouts suitable for the arrangement of the tenons and mortise joints fastening the washers 13A, 13B.

In the modified embodiments illustrated in FIGS. 16 to 19 the lining carrier plate 41 of the friction disc 15 is on the contrary disposed between the washers 13A, 13B, lying against the inner face of the washer 13A.

Figure 16:
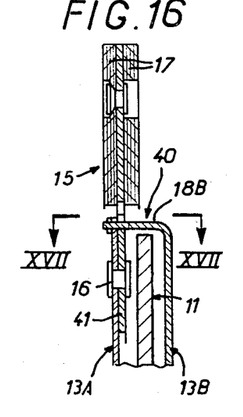
FIGS. 16 and 17 are likewise views similar to those shown in FIGS. 9 and 10 and relate to another modified embodiment.
Figure 17:
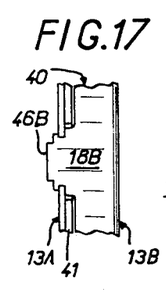

In the embodiment illustrated in FIGS. 16 and 17 it is the crown 40—in this particular case the circularly continuous axial flange 18B of the washer 13B—that is provided with tenons, as in the embodiment illustrated in FIGS. 9 to 11.

Figure 18:
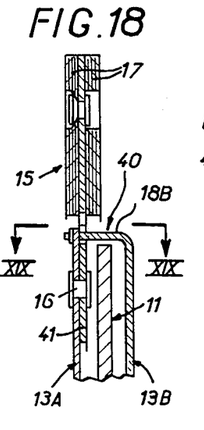
FIGS. 18 and 19 are likewise views similar to those shown in FIGS. 9 and 10, and relate to another modified embodiment.
Figure 19:
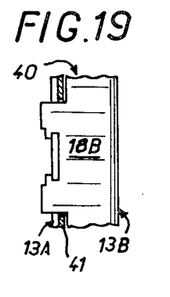

In the embodiment illustrated in FIGS. 18 and 19, on the contrary, it is the crown 40—in this particular case the circularly continuous axial flange 18B of the washer 13B which, as in the embodiment illustrated in FIGS. 5 to 8, is provided with the mortises.

Furthermore, although in the embodiments illustrated in FIGS. 5 to 8 and 9 to 11 it is the washer having a circularly continuous axial flange—in this particular case the washer 13A—that carries the friction disc 15, in the embodiments illustrated in FIGS. 12 and 13, 14 and 15, 16 and 17, and 18 and 19 the friction disc 15 is on the contrary carried by a washer not having a circularly continuous axial flange, in this particular case the washer 13A.

Figures 20, 21, 22, 23, 24, 25, 26, 27, 28:
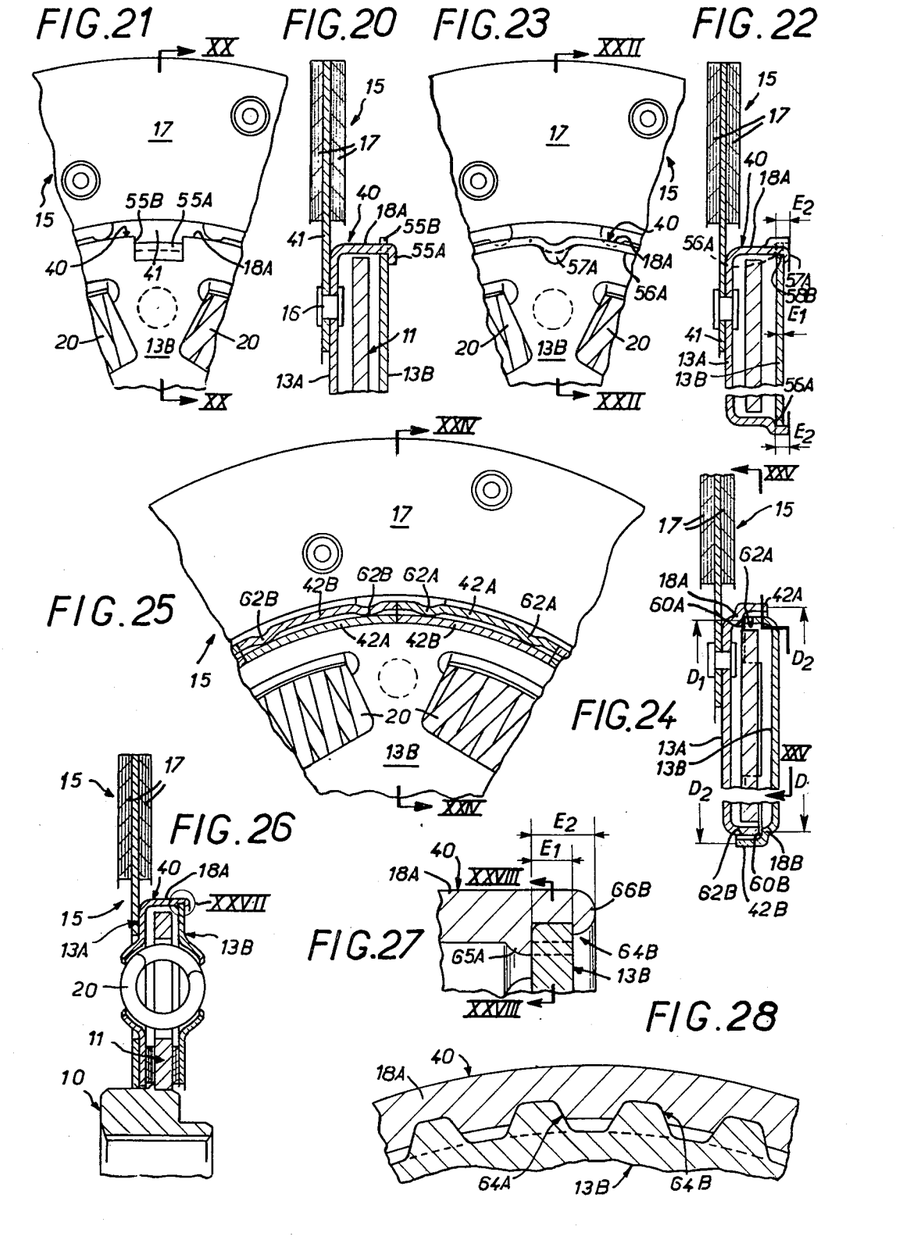
FIG. 20 is a partial view in axial section of another clutch friction element according to the invention, taken on the line XX—XX in FIG. 21.
FIG. 21 is a partial view in elevation of this clutch friction element.
FIGS. 22 and 23 are views similar respectively to those shown in FIGS. 20 and 21 and relate to a modified embodiment.
FIGS. 24 and 25 are likewise views similar respectively to those in FIGS. 20 and 21 and relate to another modified embodiment.
FIG. 26 is a partial view in axial section of another clutch friction element according to the invention.
FIG. 27 shows on a larger scale a detail of FIG. 26 corresponding to the box XXVII in FIG. 26.
FIG. 28 is a view in cross-section on the line XXVIII—XXVIII in FIG. 27.

In the embodiment shown in FIGS. 20 and 21 the crown 40 is formed by the circularly continuous axial flange 18A of the washer 13A which carries the friction disc 15, and for the purpose of fastening it to the washer 13B this circularly continuous axial flange 18A is provided from place to place with lugs 55A on its free edge, while on its periphery the washer 13B has correspondingly disposed passages 55B, these being cutouts in the example of embodiment illustrated; each of the lugs 55A is individually engaged axially in a passage 55B of this kind and, beyond the latter, is folded over to come into contact with the washer 13B which is not provided with a circularly continuous axial flange.

In the modified embodiment illustrated in FIGS. 22 and 23 the circularly continuous axial flange 18A of the washer 13A is provided internally with a shoulder 56A at an axial distance E2 from its free edge greater than the thickness E1 of the washer 13B which is not provided with a flange, and this washer 13B is engaged in the circularly continuous axial flange 18A of the washer 13A until it strikes against the shoulder 56A of the latter.

This results in a determined positioning of the washer 13B in relation to the washer 13A.

For the axial retention of the washer 13B the edge of the circularly continuous axial flange 18A of the washer 13A is from place to place locally crimped by flowing, beyond the washer 13B, in order to engage over the washer 13B, as indicated at 57A in FIG. 22.

In practice, in the embodiment illustrated, the peripheral edge of the washer 13B is provided from place to place with cutouts 58B and by local deformation the circularly continuous axial flange 18A in which it is engaged matches the said cutouts 58B, the local crimping 57A by flowing of the free edge of this flange 18A preferably being effected in positions corresponding to each of these cutouts.

In the embodiment illustrated in FIG. 24, 25 the crown 40 connecting the washers 13A, 13B has double thickness in this middle region.

The washers 13A, 13B which are advantageously identical, are in this case in fact both provided with a circularly continuous axial flange 18A, 18B from the edge of which project axial extensions 42A, 42B which for one and the same washer are alternately situated on a circumference of a diameter D1 substantially equal to that of the axial flange which it extends and on a circumference of a diameter D2 different therefrom, and being alternately imbricated radially from one washer 13A, 13B to the other.

For the sake of simplicity these diameters D1 and D2 are taken at mid-thickness in FIG. 24.

In practice, in the example illustrated the diameter D2 indicated above is greater than the diameter D1 of the axial flange in question, so that the axial extensions 42A, 42B which are situated on the circumference of diameter D2 form internally a shoulder 60A, 60B.

Likewise in practice, in the embodiment illustrated, the axial extensions 42A, 42B situated on the circumference of larger diameter D2 are locally provided with deformations 62A, 62B by which they are in contact with axial extensions 42A, 42B situated on the circumference of smaller diameter D1 and are fastened thereto, for example by spot welding.

In the embodiment illustrated in FIGS. 26 to 28 the circularly continuous axial flange 18A of the washer 13A carrying the friction disc 15 is in engagement with toothing 64B provided for the purpose on the periphery of the washer 13B which has no axial flange.

The circularly continuous axial flange 18A of the washer 13A is in turn provided with complementary toothing 64A to that of the washer 13B.

For example, the toothing 14A of the circularly continuous axial flange 18A of the washer 13A may be obtained by machining this flange with the toothing 64B of the washer 13B during relative axial engagement of the two washers in relation to one another, the washer 13B being for this purpose made of a harder material than that of the washer 13A.

For preference, as illustrated, the relative axial engagement of the washer 13B in relation to the washer 13A is limited by a stop.

In accordance with the technique described in French Pat. No. 1,096,443, this axial stop may be provided in advance, and in this case may be associated with a groove receiving the chips formed during the machining of the toothing 64A by means of the toothing 64B.

As an alternative, and as illustrated, in accordance with the technique described in the French patent recorded under No. 73 46897 and published under No. 2,256,186, this may be a stop 65A formed by the flowing of the material of the circularly continuous axial flange 18A of the washer 13A which is driven back during the engagement of the washer 13B.

However this may be, the washer 13B is preferably axially engaged in the circularly continuous axial flange 18B of the washer 13A of a length E2 greater than its thickness E1, and for the axial retention of this washer 13B the free edge of the circularly continuous axial flange 18A of the washer 13A, beyond the washer 13B, is at least locally crimped by flowing, as illustrated at 66B, in order to engage over the said washer 13B (FIG. 27).

Figure 29:
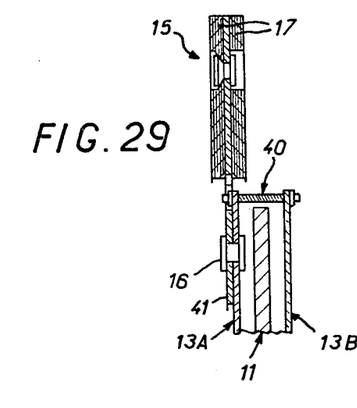
FIG. 29 is a view similar to that in FIG. 3, relating to a modified embodiment.

In accordance with the modified embodiment shown in FIG. 29, the crown 40' which as in the embodiment illustrated in FIGS. 3 and 4 originally forms a part separate from the washers 13A and 13B and has to be attached to them—is connected at points, at each of its axial ends, to the said washers 13A, 13B with the aid of mortise and tenon joints of the type described with reference to FIGS. 5 to 20, the tenon or mortise of each of these joints being at least locally crimped by flowing.

Figure 30:
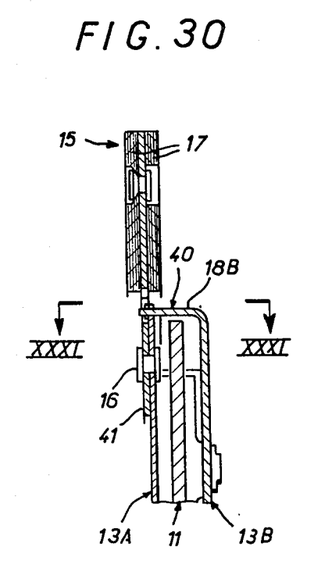
FIG. 30 is a partial view in axial section of another friction element according to the invention, taken on the line XXX—XXX in FIG. 21.
Figure 31:
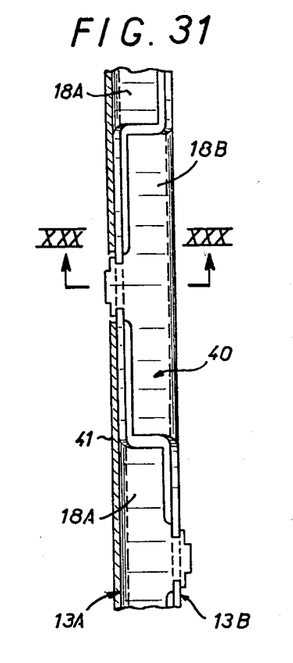
FIG. 31 is another partial view of this clutch friction element, taken on the line XXXI—XXXI in FIG. 30.

In the embodiment illustrated in FIGS. 30 and 31, complementary indentation means are provided between the washers 13A, 13B.

As illustrated, these indentation means are formed by axial extensions 42A, 42B of these washers, these extensions belonging alternately to one or the other of the washers and being fastened at their free axial end to the opposite washer to that from which they originate, for example—and as illustrated—by a tenon and mortise joint of the type described in connection with FIGS. 5 to 20.

The present invention is not limited to the embodiments described and illustrated, but covers any modified embodiment and/or combination of their various elements.

In particular, the number and the nature of the elastic means used, and also the number and nature of the friction means associated therewith, are immaterial.

Furthermore, in the case of a tenon and mortise joint, the tenon used may be divided into a plurality of elementary tenons.

I claim:

1. In a clutch disc assembly comprising two coaxial elements angularly displaceable relative to each other against the action of elastic means operatively interposed between said elements, a first of said coaxial elements comprising a hub and a second of said coaxial elements comprising first and second generally axially spaced washers, an axial extension from at least one of said washers joining said one washer to the other of said washers and defining a continuous axial flange at the periphery of said one washer, said first washer carrying a friction disc, the improvement comprising means for fastening said friction disc to said first washer disposed within the circumference of said axial flange and said friction disc freely extending radially outwardly beyond said axial flange.

2. A clutch disc assembly according to claim 1, wherein said axial flange is formed in one piece with said one washer.

3. A clutch disc assembly according to claim 1, wherein an axial extension is also provided on said other washer by which it is joined to said one washer.

4. A clutch disc assembly according to claim 2, wherein said axial extensions define an annular crown extending axially continuously from the outer periphery of said one washer to the outer periphery of said other washer.

5. A clutch disc assembly according to claim 3, wherein said axial extensions on said washers together defining an annular crown extending axially continuously from the outer periphery of said one washer to the outer periphery of said other washer.

6. A clutch disc assembly according to claim 1, wherein said axial flange comprises a piece distinct from and fixed to said one washer at one end of said flange and to said other washer at the other end of said axial flange.

7. A clutch disc assembly according to claim 1, wherein said hub comprises a hub disc disposed axially between said washers, and confined radially within said axial flange.

8. A clutch disc assembly according to claim 1, further comprising mortises disposed at spaced locations along the free edge of said axial flange, and tenons disposed radially at spaced locations at the periphery of said other washer and directed perpendicularly to the axis of the clutch disc assembly, each tenon being in engagement in one of said mortises, the axial thicknesses of the tenons being less than the corresponding depths of said mortises, at least one of the circumferential edges of each of said mortises being crimped over its corresponding tenon.

9. A clutch disc assembly according to claim 1, further comprising tenons projecting at spaced locations along the free edge of said axial flange parallel to the axis of the clutch disc assembly, and mortises at corresponding spaced locations at the periphery of said other washer, said tenons being individually received in said mortises and crimped over said other washer to join said washers together.

10. A clutch disc assembly according to claim 9, wherein each tenon is flanked laterally on each side by a support shoulder axially projecting in relation to the remainder of said axial flange.

11. A clutch disc according to claim 8, wherein said first washer is said one washer.

12. A clutch plate assembly according to claim 8, wherein said first washer is said other washer.

13. A clutch disc assembly according to claim 10, wherein said friction disc is disposed on the side of said first washer axially remote from said second washer.

14. A clutch disc assembly according to claim 11 or 44, wherein said friction disc is disposed axially between said washers.

15. A clutch disc assembly according to claim 1, further comprising lugs disposed at circumferentially spaced locations at the free edge of said axial flange for joining said axial flange to said other washer, said other washer being provided with cutouts at corresponding circumferentially spaced locations at its periphery, each lug being individually in axial engagement with one of said cutouts and bent over into contact with said other washer.

16. A clutch disc assembly according to claim 15, wherein said axial extensions are solely on said one washer.

17. A clutch disc assembly according to claim 1, wherein said axial flange has an internal shoulder at an axial distance from that edge thereof remote from said one washer, said distance being greater than the thickness of said other washer, said other washer bearing against said internal shoulder of said axial flange, said remote edge of said axial flange being crimped at spaced locations over said other washer.

18. A clutch disc assembly according to claim 17, wherein the outer peripheral edge of said other washer is provided with cutouts at spaced locations therealong, and portions of said axial flange being in mating engagement with said cutouts.

19. A clutch disc assembly according to claim 3, wherein each washer has an axial extension forming said axial flange and each axial extension being in the form of a plurality of axial tabs, said tabs associated with said one washer alternately radially inside and outside the circumferentially corresponding ones of said tabs associated with said other washer, radially inner tabs being disposed on different radial distances from radially outer tabs.

20. A clutch disc assembly according to claim 19, further comprising local deformations on said radially outer tabs in contact with and fastened to corresponding circumferentially radially inner tabs.

21. A clutch disc assembly according to claim 1, said axial flange extending solely from said one washer and teeth on said other washer in engagement with said axial flange extending from said one washer.

22. A clutch disc assembly according to claim 21, said axial flange being provided with teeth matingly complementary to said teeth on said other washer.

23. A clutch disc assembly according to claim 22, said teeth on said other washer having formed said teeth on said axial flange in the course of assembly of said radial flange and said other washer.

24. A clutch disc assembly according to claim 22, said other washer being received axially inside said axial flange, said axial flange having a free edge locally crimped and joining said axial flange to said other washer.

25. A clutch disc assembly according to claim 1, wherein there are axial extensions alternately extending from said one washer and said other washer and joined to said other washer and said one washer respectively.

26. A clutch disc assembly according to claim 1, wherein there is one of said extensions formed integrally with each washer.

27. A clutch disc assembly according to claim 1, wherein the inner periphery of the friction lining on said friction disc is disposed within the immediate vicinity of said axial flange.

28. A clutch disc assembly according to claim 1 or 39, wherein said elastic means comprise a circumferential array of coil springs received in tangential windows defined in said washers.

29. A clutch disc assembly according to claim 1, characterized in that each of said washers has an axial extension and there are tenon-mortise assembling means between said axial extensions.

* * * * *